(12) United States Patent
Houts et al.

(10) Patent No.: US 11,625,856 B2
(45) Date of Patent: Apr. 11, 2023

(54) LOCALIZATION SYSTEMS AND METHODS

(71) Applicant: Ford Global Technologies, LLC., Dearborn, MI (US)

(72) Inventors: Sarah Houts, Sunnyvale, CA (US); Praveen Narayanan, San Jose, CA (US); Punarjay Chakravarty, Campbell, CA (US); Gaurav Pandey, Foster City, CA (US); Graham Mills, Oakland, CA (US); Tyler Reid, Menlo Park, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 144 days.

(21) Appl. No.: 17/160,259

(22) Filed: Jan. 27, 2021

(65) Prior Publication Data

US 2021/0150761 A1    May 20, 2021

Related U.S. Application Data

(63) Continuation of application No. 16/297,170, filed on Mar. 8, 2019, now Pat. No. 10,949,997.

(51) Int. Cl.
*G06T 5/00* (2006.01)
*G05D 1/02* (2020.01)
*G06T 7/73* (2017.01)
*H04L 67/12* (2022.01)

(52) U.S. Cl.
CPC .............. *G06T 7/74* (2017.01); *G05D 1/0246* (2013.01); *G06T 5/003* (2013.01); *G06T 5/009* (2013.01); *G06T 2207/20084* (2013.01); *G06T 2207/20208* (2013.01); *G06T 2207/30256* (2013.01); *H04L 67/12* (2013.01)

(58) Field of Classification Search
None
See application file for complete search history.

(56) References Cited

U.S. PATENT DOCUMENTS

2019/0303669 A1* 10/2019 Spooner ............... G06V 20/176
2019/0354804 A1* 11/2019 Ros Sanchez ......... G06N 20/00

\* cited by examiner

*Primary Examiner* — Idowu O Osifade
(74) *Attorney, Agent, or Firm* — David R. Stevens; Stevens Law Group (57) ABSTRACT

Example localization systems and methods are described. In one implementation, a method receives a camera image from a vehicle camera and cleans the camera image using a VAE-GAN (variational autoencoder combined with a generative adversarial network) algorithm. The method further receives a vector map related to an area proximate the vehicle and generates a synthetic image based on the vector map. The method then localizes the vehicle based on the cleaned camera image and the synthetic image.

20 Claims, 11 Drawing Sheets

LOCALIZATION SYSTEMS AND METHODS

RELATED APPLICATIONS

The present application is a continuation of U.S. patent application Ser. No. 16/297,170 entitled "Localization Systems And Methods", filed on Mar. 8, 2019, which is incorporated by reference in its entirety.

TECHNICAL FIELD

The present disclosure relates to localization systems and methods, such as localization systems and methods for an autonomous vehicle.

BACKGROUND

Automobiles provide a significant portion of transportation for commercial, government, and private entities. Autonomous vehicles and driving assistance systems are currently being developed and deployed to provide safety, reduce an amount of user input required, or even eliminate user involvement entirely. For example, some driving assistance systems, such as crash avoidance systems, may monitor driving, positions, and a velocity of the vehicle and other objects while a human is driving. When the system detects that a crash or impact is imminent the crash avoidance system may intervene and apply a brake, steer the vehicle, or perform other avoidance or safety maneuvers. As another example, autonomous vehicles may drive and navigate a vehicle with little or no user input. Accurate and fast vehicle localization is often necessary to enable automated driving systems or driving assistance systems to safely navigate roads or driving routes.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

Localization is an important part of allowing for and improving operation of autonomous vehicles or driver assistance features. For example, a vehicle must know precisely where it is in the world (or with respect to a map) in order to navigate safely. Localization may identify a vehicle's location based on, for example, lane lines, traffic signs, traffic lights, and the like. A large variety of current approaches exist to localize with respect to a map of the world, but require a substantial quantity of computation to do so, or necessitate the use of expensive, power-hungry sensors, such as light detection and ranging (LIDAR) sensors.

Applicants have developed systems, methods, and devices for localization of vehicles or other purposes. According to one embodiment, a system for determining a position of a vehicle performs a comparison between sensor data (such as camera data) and a vector map. The system uses a VAE-GAN (variational autoencoder combined with a generative adversarial network) to improve the robustness of the matching between a current camera image and a synthetic image generated from a vector map.

Figure 1:
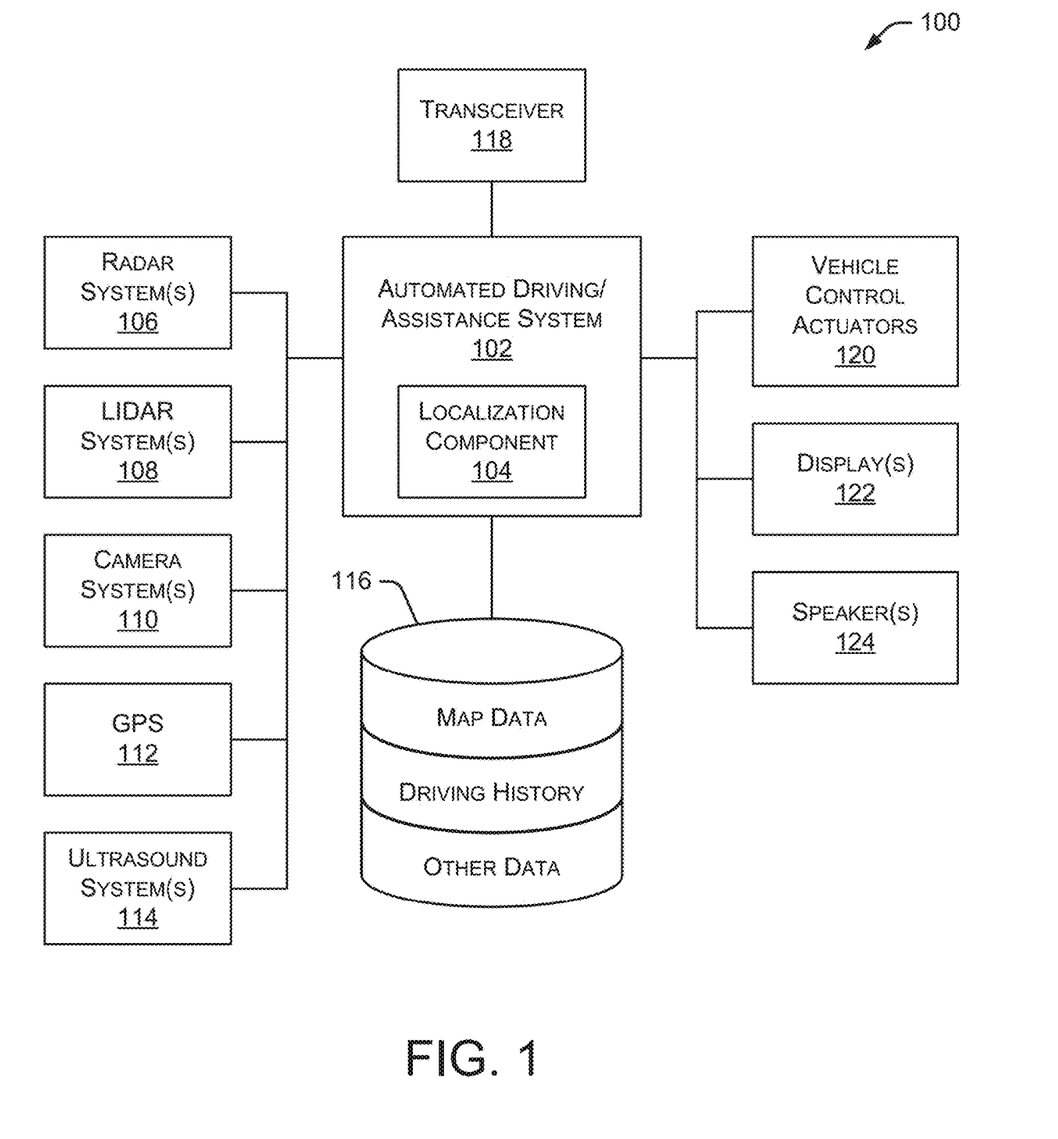
FIG. 1 is a schematic block diagram illustrating an embodiment of a vehicle control system that includes an automated driving/assistance system.

FIG. 1 is a schematic block diagram illustrating an embodiment of a vehicle control system 100 that includes an automated driving/assistance system 102. The automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may use a neural network, or other model or algorithm to detect or localize objects based on perception data gathered by one or more sensors.

The vehicle control system 100 also includes one or more sensor systems/devices for detecting a presence of objects near or within a sensor range of a parent vehicle (e.g., a vehicle that includes the vehicle control system 100). For example, the vehicle control system 100 may include one or more radar systems 106, one or more LIDAR systems 108, one or more camera systems 110, a global positioning system (GPS) 112, and/or one or more ultrasound systems 114. The vehicle control system 100 may include a data store 116 for storing relevant or useful data for navigation and safety such as map data, driving history or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time.

In some embodiments, the vehicle control system 100 includes a localization component 104 to determine a location of the vehicle with respect to map, roadway, or the like. For example, the localization component 104 may use an on-board camera to localize the vehicle with respect to a prior created or obtained map. In a particular embodiment, the localization component 104 may enable the vehicle control system 100 to localize the vehicle without using active sensors such as LIDAR or radar, which emit energy in the environment and detect reflections. The map may include a vector-based semantic map or a LIDAR intensity map. Localization component 104 may perform a comparison between camera data and a vector map do determine a position of the vehicle. In some embodiments the vector map is generated based on collected data, such as collected LIDAR data. In other embodiments, the vector map is generated based on simulated or computer-generated data.

The systems and methods described herein reduce the amount of storage space required for storing map data and the like. Additionally, these systems and methods include one or more trained neural networks that operate quickly and generate fast results.

Figure 2:
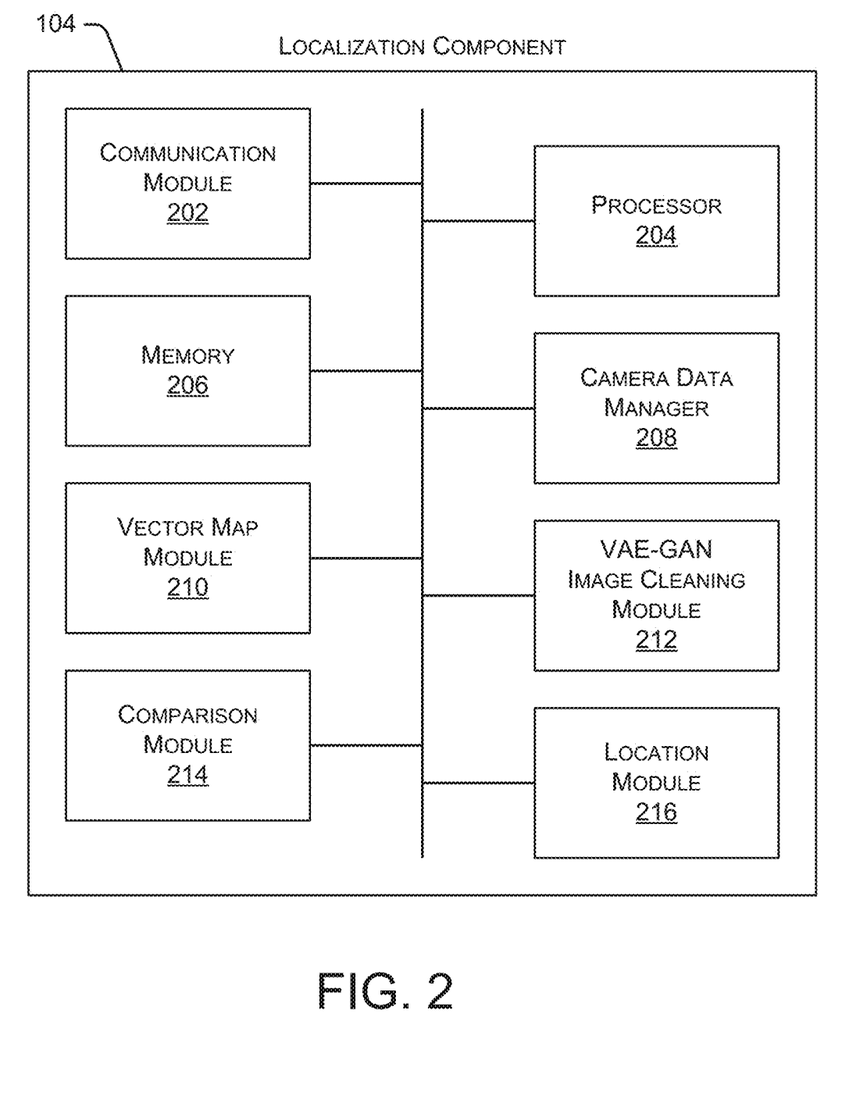
FIG. 2 illustrates an embodiment of a localization component.

FIG. 2 illustrates an embodiment of localization component 104. As shown in FIG. 2, localization component 104 includes a communication module 202, a processor 204, and a memory 206. Communication module 202 allows localization component 104 to communicate with other systems and devices. Processor 204 executes various instructions to implement the functionality provided by localization component 104, as discussed herein. Memory 206 stores these instructions as well as other data used by processor 204 and other modules and components contained in localization component 104.

A camera data manager 208 receives and manages data, such as image data, from one or more cameras or other sensors. In some embodiments, the image data may include a top-down view of a ground surface or driving surface based on one or more camera images captured by an image sensor on a vehicle. A vector map module 210 manages vector map data and the synthetic images generated from the vector maps.

Localization component 104 also includes a VAE-GAN image cleaning module 212 that "cleans" camera images before they are compared with the synthetic images, as discussed in greater detail below. A comparison module 214 compares the camera images with the synthetic images that are generated based on vector map data. In some embodiments, comparison module 214 may calculate a score indicating a match between one or more camera images and one or more synthetic images. A location module 216 determines a location of the vehicle on a map or other system based on the results of the comparison performed by comparison module 214. Additional details regarding the operation of localization component 104 are discussed herein.

Figure 3A:
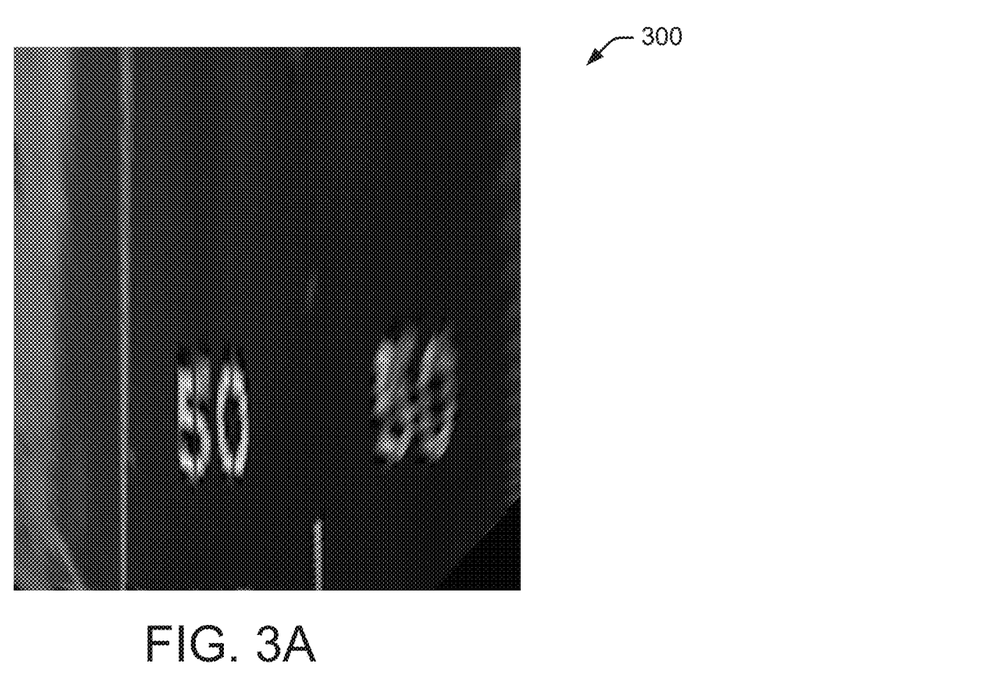
FIG. 3A illustrates an embodiment of a birds-eye-view camera image.

The systems and methods described herein begin with a birds-eye-view image from a camera (or generated from image data from one or more cameras). For example, the birds-eye-view image may be generated from a single forward-facing camera associated with a vehicle by projecting the forward-facing image to be a top-down view using standard homography. FIG. 3A illustrates an embodiment of a generated birds-eye-view camera image 300.

Figure 3B:
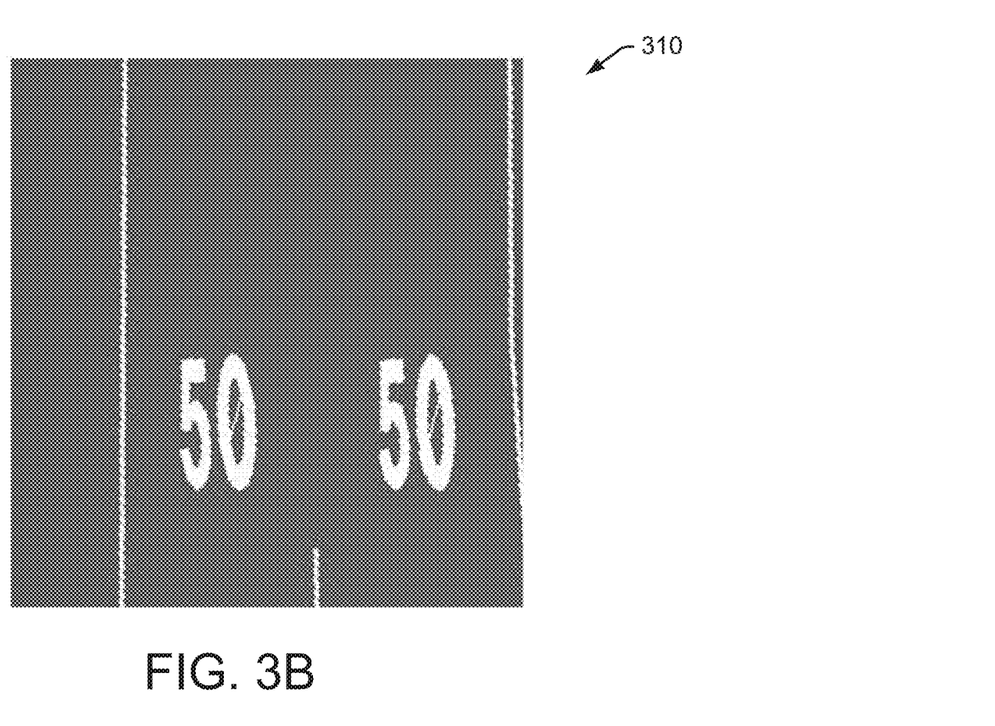
FIG. 3B illustrates an embodiment of a synthetic image generated from a vector map.

As the birds-eye-view image is being generated, the systems and methods extract a nearby section of a vector map (e.g., lines and polygons in 3D space) and create a synthetic image based on the extracted vector map. The synthetic image has the road lines scaled to the normal width of road paint lines (such as approximately 10 cm) and fills in the polygons for the road numbers. In some embodiments, white is used for the paint sections and dark gray is used for the background. FIG. 3B illustrates an embodiment of a synthetic image 310 generated from a vector map. As shown in FIG. 3A, the generated birds-eye-view camera image 300 includes sampling artifacts that do not exist in synthetic image 310. These sampling artifacts are partly due to the "50" on the right lane being farther away from the camera, which results in fewer pixels being mapped into the same physical area.

Figure 4:
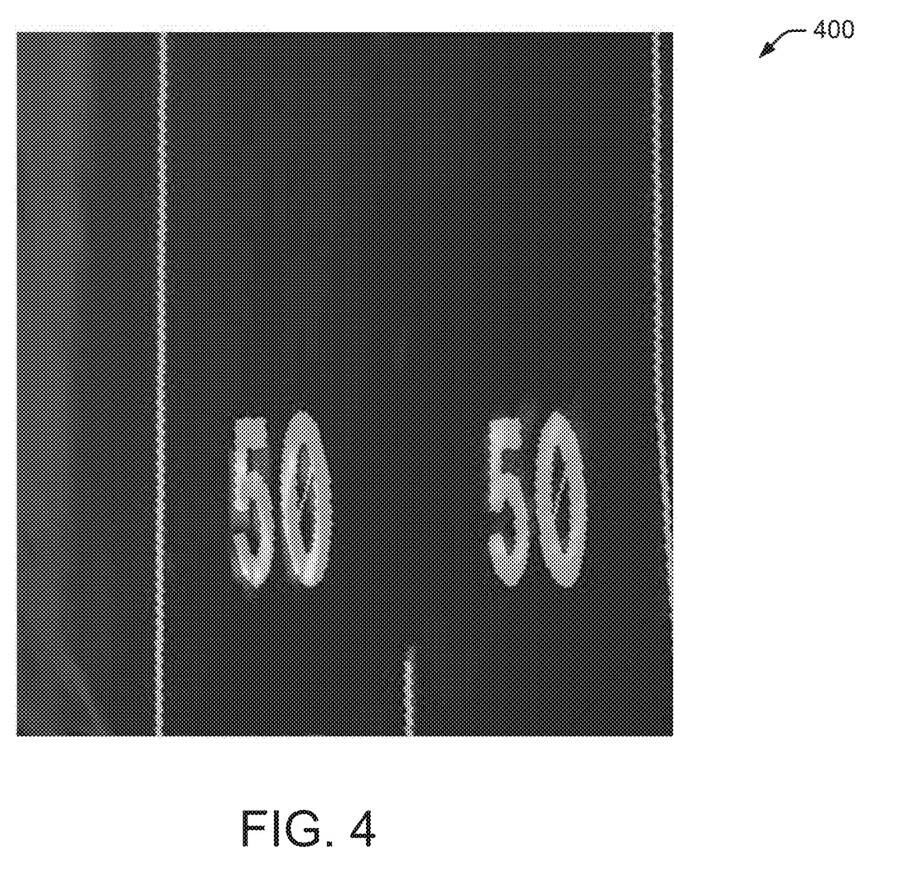
FIG. 4 illustrates an embodiment of an overlay of a birds-eye-view camera image and a synthetic image.

FIG. 4 illustrates an embodiment of an overlay 400 of birds-eye-view camera image 300 and synthetic image 310. In some embodiments, when comparing birds-eye-view camera image 300 and synthetic image 310, a NMI (Normalized Mutual Information) metric is used, for a grid of shifted x, y, and heading values.

Figure 5:
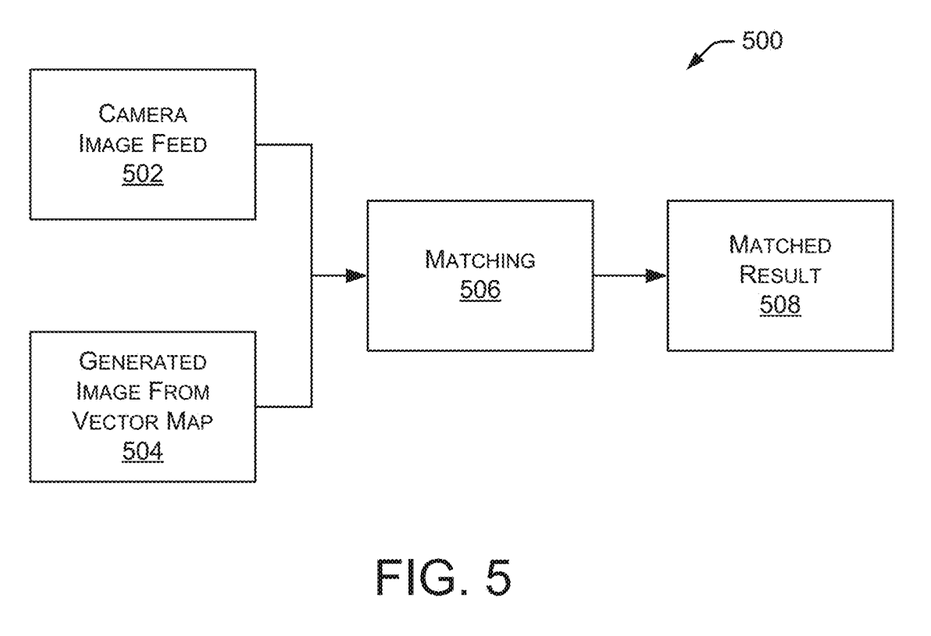
FIG. 5 illustrates an embodiment of a method for comparing camera images with synthetic images generated from a vector map.

FIG. 5 illustrates an embodiment of a method 500 for comparing camera images with synthetic images generated from a vector map. The current camera image 502 and the generated image from the vector map 504 are applied to a matching operation 506 to generate a matched result 508. This approach works well in particular situations (such as the situation shown in FIGS. 3A, 3B, and 4) where the conditions are close to ideal. For example, close to ideal conditions include plenty of road paint for the lines and speed limit numbers as well as good lighting conditions. Example good lighting conditions include an overcast day with no shadows and no low sun angle.

Figure 6:
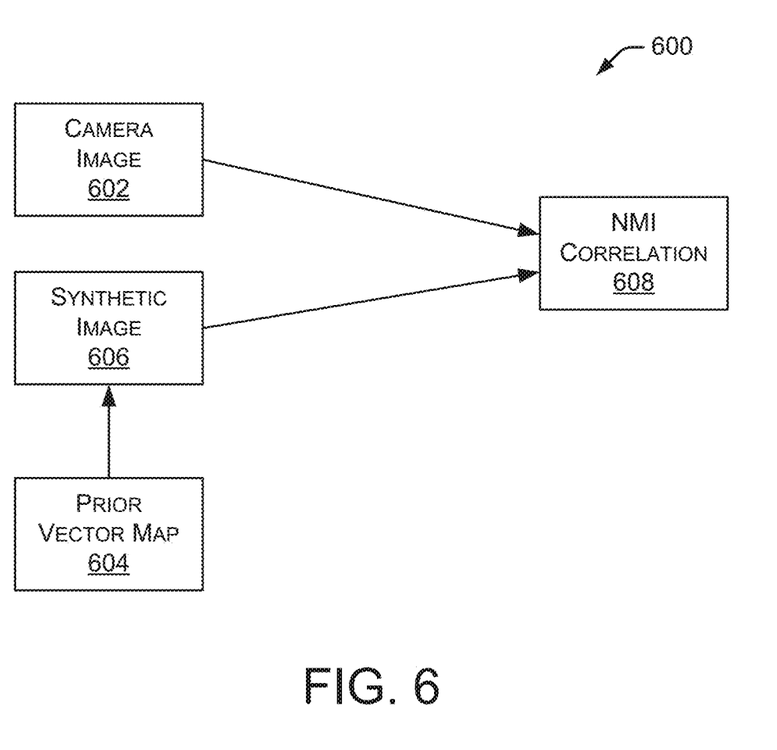
FIG. 6 is a block diagram illustrating an embodiment of a matching system.

FIG. 6 is a block diagram illustrating an embodiment of a matching system 600. In the example of FIG. 6, a prior vector map 604 is used to create a synthetic image 606. The synthetic image 606 is provided to a NMI (Normalized Mutual Information) correlation system 608 along with a camera image 602. In some embodiments, NMI correlation system 608 performs image matching operations similar to matching operation 506 in FIG. 5. NMI correlation represents one way to perform image matching. In other embodiments, any type of image matching technique may be used to perform the image matching operations discussed herein.

Figure 7:
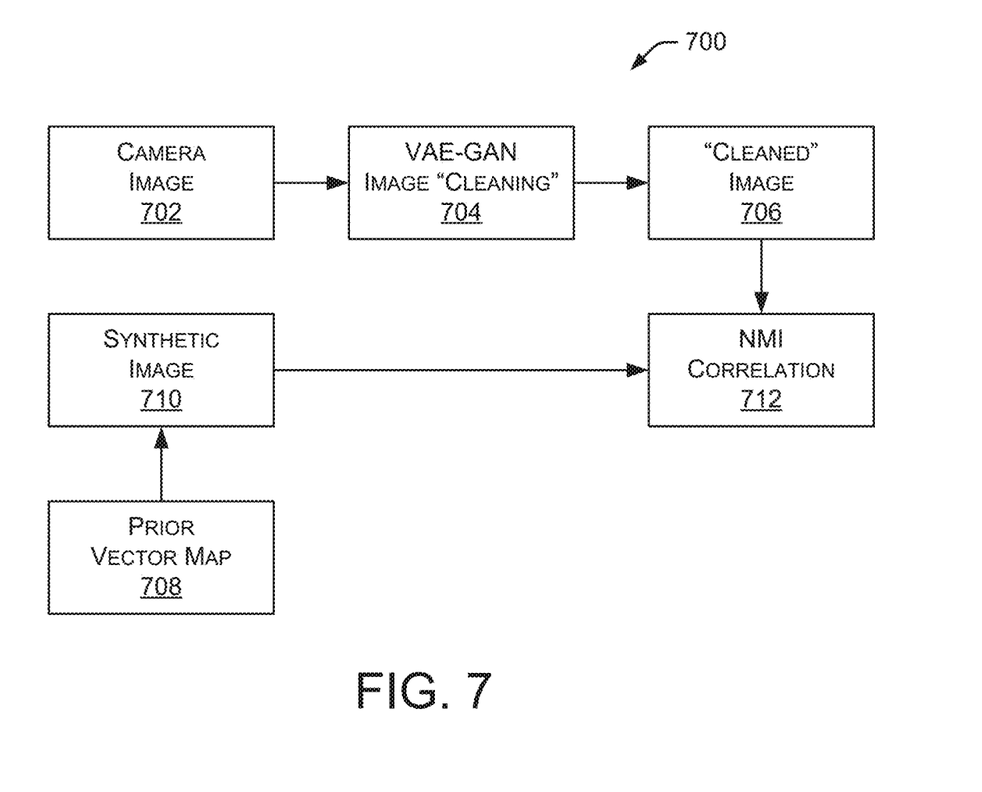
FIG. 7 is a block diagram illustrating another embodiment of a matching system.

FIG. 7 is a block diagram illustrating another embodiment of a matching system 700. The example of FIG. 7 represents an improved matching approach that enhances the previously described method by cleaning up the current camera image to make it look more like the synthetic image generated from the vector map. This enhancement improves the ability of NMI, or other weighting algorithms, to get a clean match, which makes the localization algorithm more robust. The example of FIG. 7 also reduces, or eliminates, some of the lighting challenges that arise with cameras detecting the road paint. For example, matching system 700 shown in FIG. 7 improves contrast in bright light conditions and reduces, or eliminates, patchiness caused by shadows.

In the example of FIG. 7, a camera image 702 is provided to a VAE-GAN image cleaning system 704, which generates a "cleaned" image 706. For example, the VAE portion is effectively performing a domain adaption from raw or noisy image data to synthetic-style images. And, the GAN discriminator produces crisper images from the VAE. Although particular examples discussed herein use a VAE-GAN image cleaning system, alternate embodiments may use any architecture, system, or process to clean the raw image data.

In some embodiments, VAE-GAN image cleaning system 704 receives a birds-eye-view camera image and produces a cleaned image 706 that has the style of the synthetic images produced from the vector map. For this type of neural network, it must first be trained (e.g., a training stage) before it can be used in practice (e.g., an inference stage), as discussed below.

The "cleaned" image 706 is provided to NMI correlation system 712. A prior vector map 708 is used to generate a synthetic image 710, which is provided to NMI correlation system 712. In some embodiments, NMI correlation system 712 operates in a manner similar to NMI correlation system 608 discussed above with respect to FIG. 6.

Figure 8:
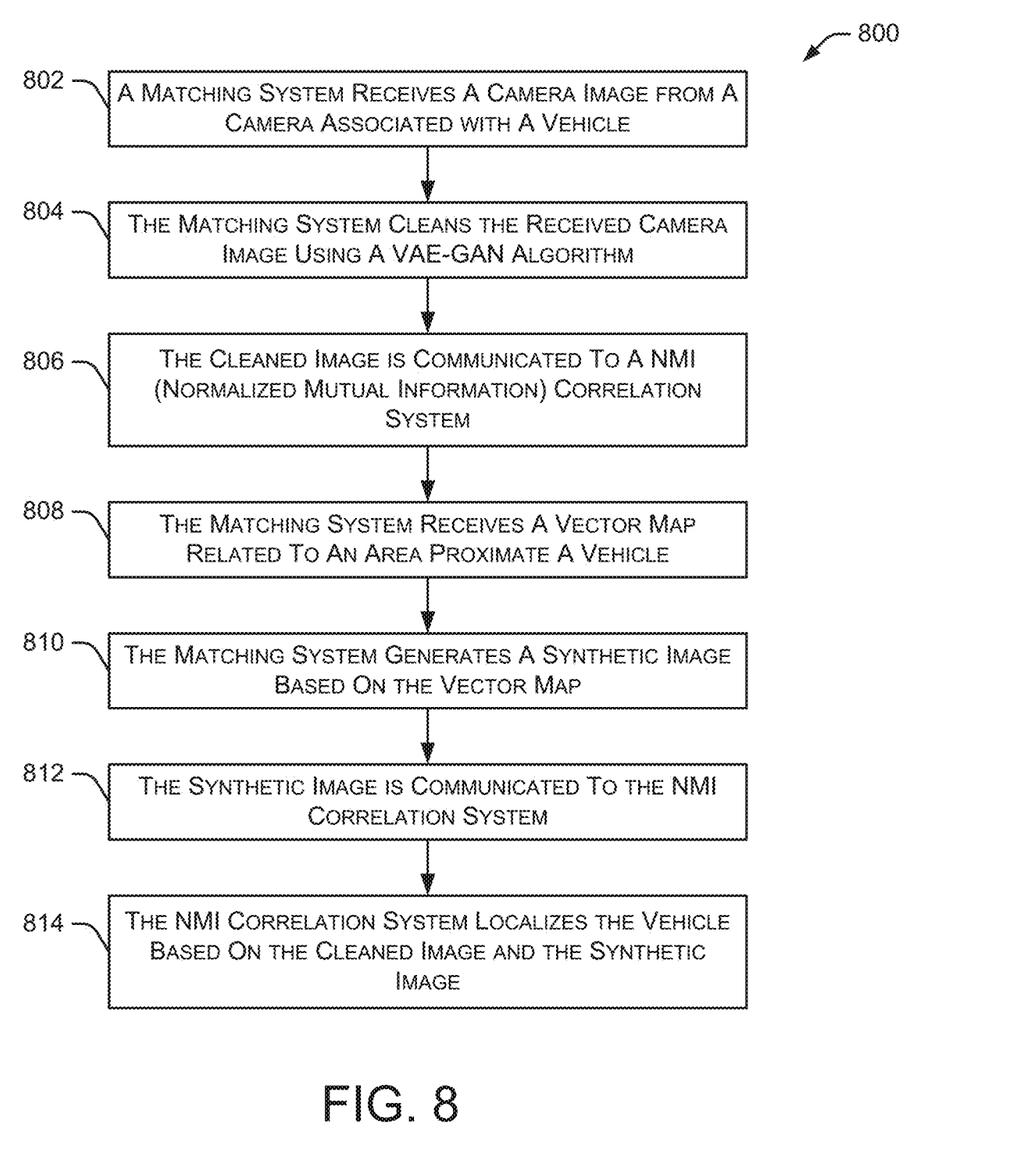
FIG. 8 illustrates an embodiment of a method for matching camera images with synthetic images generated from a vector map.

FIG. 8 illustrates an embodiment of a method 800 for matching camera images with synthetic images generated from a vector map. Initially, a matching system receives 802 a camera image from a camera associated with a vehicle. The matching system cleans 804 the received camera image using a VAE-GAN algorithm. The cleaned image is then communicated 806 to a NMI correlation system. The matching system also receives 808 a vector map related to an area proximate a vehicle. The matching system then generates 810 a synthetic image based on the vector map. The synthetic image is communicated 812 to the NMI correlation system. Method 800 continues as the NMI correlation system localizes 814 the vehicle based on the cleaned image and the synthetic image. The localizing of the vehicle includes generating vehicle location data, such as geographic location data and the like. In some embodiments, method 800 communicates the vehicle location data to an automated driving system (or driving assistance system) associated with the vehicle, such as automated driving/assistance system 102 shown in FIG. 1. In particular implementations, method 800 communicates the vehicle location data to one or more other systems, components, or processes.

Figure 9:
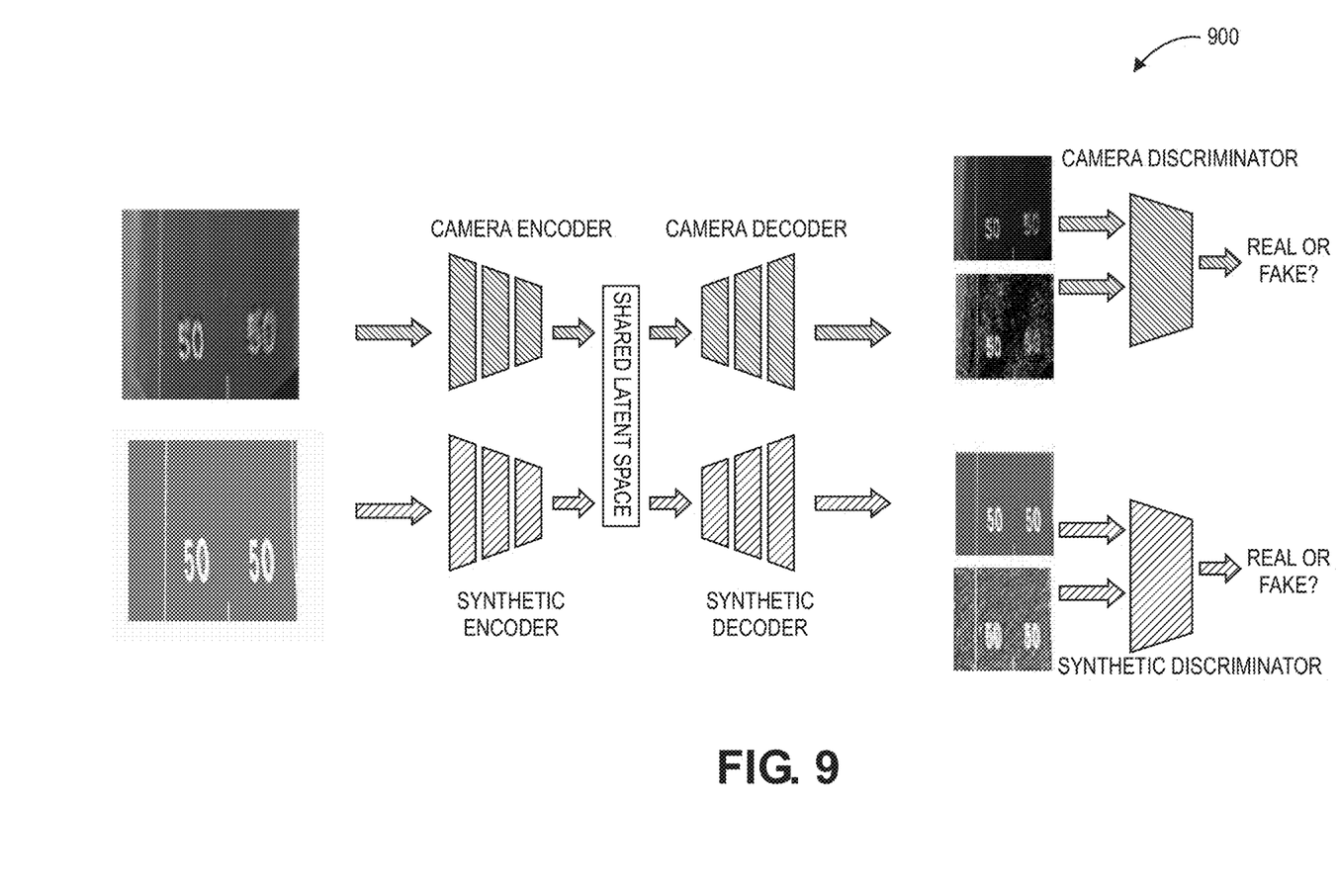
FIG. 9 is a block diagram illustrating an embodiment of a shared latent space architecture.

FIG. 9 is a block diagram illustrating an embodiment of a shared latent space architecture 900 associated with the training stage. As shown in FIG. 9, the VAE has a shared latent space formulation. In this example, the latent space is shared between the two domains, such as the birds-eye-view image from the camera, which will be referred to as the camera domain, and the synthetic birds-eye-view generated from the vector map, which will be referred to as the synthetic domain. This shared latent space is obtained in practice by sharing the weights of the last few layers of the encoders for the two domains and also sharing the weights for the first few layers of the decoders for the two domains.

The sharing of the latent space allows the systems and methods described herein to encode from one domain to the other. Thus, a camera image, encoded into latent space through the camera encoder, can be decoded through the synthetic decoder to produce the corresponding synthetic birds-eye-view image, as would be produced by the vector map. The sharing of latent space also allows the systems and methods to train with non-matching pairs of camera and synthetic images. In some embodiments, there are four loss functions in the training of the VAE:

1. The loss in reconstructing the camera image.
2. The loss in reconstructing the synthetic image.
3. The loss in reconstructing the synthetic image from the camera image.
4. The loss in reconstructing the camera image from the synthetic images.

Losses 3 and 4 can be thought of as cyclic losses, which transfer an image from one domain to another, and back to the same domain. In this situation, the systems and methods don't need matching training pairs of camera and synthetic images. The network learns from translating the camera image to the synthetic domain and back to the original camera domain.

In some embodiments, the decoder of the VAE is replaced by a GAN to generate output images. It is used in conjunction with a discriminator that learns to tell if the images produced are real or fake. This is a method for improving the outputs produced by the VAE, which tend to be blurry.

In some embodiments, the VAE-GAN is trained by taking a set of camera images and synthetic images from the vector map. These images do not need to be aligned, which is helpful during training. For example, he images can be collected by mounting a camera on a car and driving the same route as a trajectory in the vector map without needing to explicitly align the two.

Figure 10:
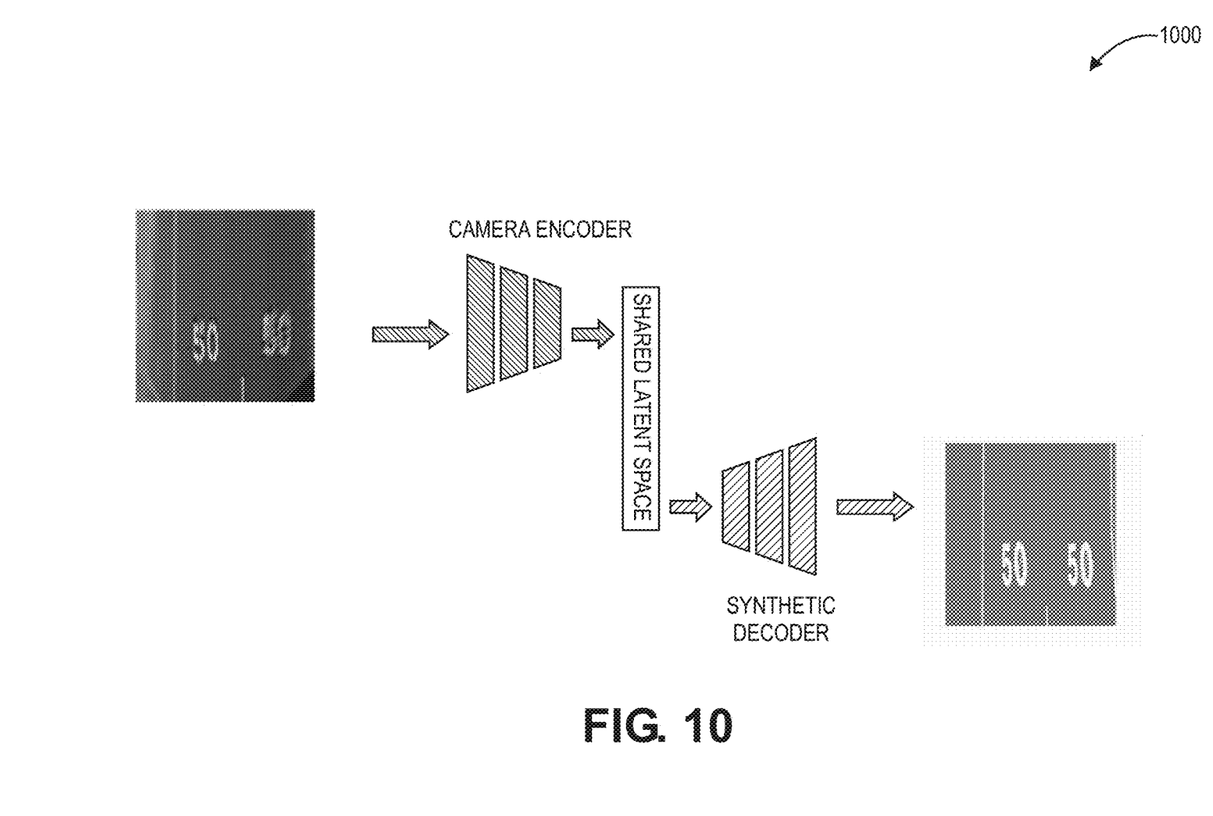
FIG. 10 is a block diagram illustrating an embodiment of a trained network to generate synthetic images from camera images.

FIG. 10 is a block diagram illustrating an embodiment of a trained network 1000 to generate synthetic images from camera images. The example of FIG. 10 is associated with the inference stage. In some embodiments, during inference, the trained VAE's camera encoder is used to encode the image coming from the camera into the shared latent space, which is then decoded using the synthetic decoder in the VAE to produce the synthetic image. Thus, a raw birds-eye-view camera image received as input, and the cleaned up synthetic-style image is generated as the output.

In particular implementations, the VAE-GAN image "cleaning" process is used as a preprocessing step for images when creating vector maps. For example, by having cleaner, less noisy images to work with, automatic extraction of the lines and polygons as vectors becomes a simpler problem.

The overall localization approach described here provides a lower-cost solution for localization of an autonomous vehicle, utilizing an inexpensive camera sensor and relatively small vector maps. By producing images that make the current camera images more closely match the synthetic images from the vector map, the described systems and methods improve the robustness of matching and eliminate some of the detrimental effects of lighting variation.

Figure 11:
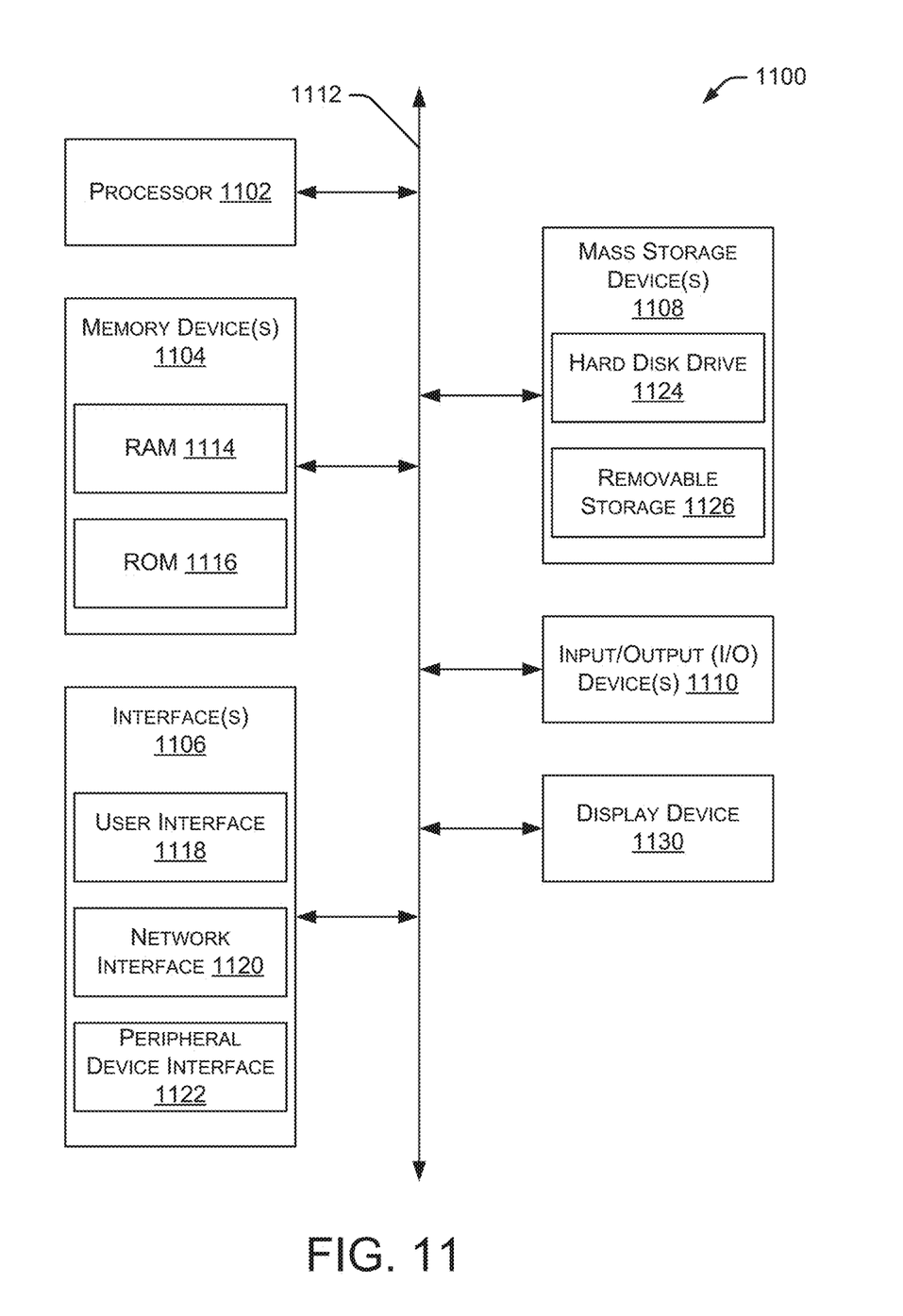
FIG. 11 illustrates an example block diagram of a computing device.

FIG. 11 illustrates an example block diagram of a computing device 1100. Computing device 1100 may be used to perform various procedures, such as those discussed herein. For example, computing device 1100 may perform any of the functions or methods of automated driving/assistance system 102, localization component 104, and/or any other computing entity. Computing device 1100 can perform various functions as discussed herein, and can execute one or more application programs, such as the application programs or functionality described herein. Computing device 1100 can be any of a wide variety of computing devices, such as a desktop computer, in-dash computer, vehicle control system, a notebook computer, a server computer, a handheld computer, tablet computer, a wearable device, and the like.

Computing device 1100 includes one or more processor(s) 1102, one or more memory device(s) 1104, one or more interface(s) 1106, one or more mass storage device(s) 1108, one or more Input/Output (I/O) device(s) 1110, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, microphones, monitors or other display devices, speakers, printers, network interface cards, modems, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 may include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more user interface elements 1118. The interface(s) 1106 may also include one or more peripheral interfaces such as interfaces for printers, pointing devices (mice, track pad, or any suitable user interface now known to those of ordinary skill in the field, or later discovered), keyboards, and the like.

Bus 1112 allows processor(s) 1102, memory device(s) 1104, interface(s) 1106, mass storage device(s) 1108, and I/O device(s) 1110 to communicate with one another, as well as other devices or components coupled to bus 1112. Bus 1112 represents one or more of several types of bus structures, such as a system bus, PCI bus, IEEE bus, USB bus, and so forth.

For purposes of illustration, programs and other executable program components are shown herein as discrete blocks, although it is understood that such programs and components may reside at various times in different storage components of computing device 1100, and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method for localization, the method comprising:
    receiving, by a localization component, a camera image from a vehicle camera;
    cleaning, by the localization component, the camera image using a VAE-GAN (variational autoencoder combined with a generative adversarial network) algorithm to generate a cleaned camera image;
    receiving a synthetic image related to an area proximate the vehicle; and
    localizing, by the localization component, the vehicle based on the cleaned camera image and the synthetic image.

2. The method of claim 1, wherein the cleaning comprises:
    encoding the camera image;
    transmitting the encoded camera image to a shared latent space;
    retrieving the encoded camera image from the shared latent space;
    decoding the encoded camera image via a synthetic decoder to generate a decoded image; and
    generating the cleaned camera image from the decoded image.

3. The method of claim 1, wherein the cleaned camera image contains a lower noise level compared to the camera image.

4. The method of claim 1, further comprising using one or more cleaned camera images to generate a vector map.

5. The method of claim 1, wherein the camera image is a birds-eye-view image.

6. The method of claim 1, further comprising a training process for the VAE-GAN, the training comprising:
    receiving a training camera image;
    receiving a training synthetic image;
    a camera encoder encoding the training camera image;
    a synthetic encoder encoding the training synthetic image;
    a camera decoder decoding the encoded training camera image and the encoded training synthetic image to generate a first decoded training camera image and a first decoded training synthetic image;
    a synthetic decoder decoding the encoded training camera image and the encoded training synthetic image to generate a second decoded training camera image and a second decoded training synthetic image;
    a camera discriminator analyzing the first decoded training camera image and the first decoded training synthetic image to determine whether a combination of the training camera image and the training synthetic image is real or fake; and
    a synthetic discriminator analyzing the second decoded training camera image and the second decoded training synthetic image to determine whether a combination of the training camera image and the training synthetic image is real or fake.

7. The method of claim 6, further comprising generating a shared latent space, the generating comprising:
sharing one or computing weights associated with one or more final layers of each of the camera encoder and the synthetic encoder; and
sharing one or more computing weights associated with one or more initial layers of the camera decoder and the synthetic decoder.

8. The method of claim 7, further comprising storing the encoded camera image and the encoded synthetic image in the shared latent space.

9. The method of claim 8, further comprising the camera decoder and the synthetic decoder each retrieving the encoded camera image and the encoded synthetic image from the shared latent space.

10. The method of claim 6, wherein the training is tolerant of misalignment between the training camera image and the training synthetic image.

11. The method of claim 6, wherein the training further includes:
translating the training camera image from a camera domain associated with the training camera image to a synthetic domain associated with the training synthetic image; and
translating the training camera image and the training synthetic image from the synthetic domain to the camera domain.

12. The method of claim 1, wherein localizing the vehicle includes generating vehicle location data.

13. The method of claim 12, further comprising communicating the vehicle location data to an automated driving system associated with the vehicle.

14. A localization system comprising:
a processor; and
a memory device coupled to the processor, the memory device configured to store instructions for execution on the processor, the instructions causing the processor to:
receive a camera image from a vehicle camera;
clean the camera image using a VAE-GAN (variational autoencoder combined with a generative adversarial network) algorithm to generate a cleaned camera image;
receive a synthetic image related to an area proximate the vehicle; and
localize the vehicle based on the cleaned camera image and the synthetic image.

15. The localization system of claim 14, wherein the instructions further cause the processor to:
communicate the cleaned camera image a NMI (Normalized Mutual Information) correlation system; and
communicate the synthetic image to the NMI correlation system.

16. The localization system of claim 14, wherein the vehicle is localized by matching the cleaned camera image with the synthetic image.

17. The localization system of claim 14, wherein the cleaning includes the processing system configured to:
encode the camera image;
transmit the encoded camera image to a shared latent space;
retrieve the encoded camera image from the shared latent space;
decode the encoded camera image via a synthetic decoder to generate a decoded image; and
generate the cleaned camera image from the decoded image.

18. The localization system of claim 14, wherein the processing system generates vehicle location data.

19. The localization system of claim 18, wherein the processing system communicates the vehicle location data to an automated driving system associated with the vehicle.

20. The localization system of claim 14, wherein the processing system localizes the vehicle using an output generated by an NMI correlation system.

\* \* \* \* \*